United States Patent
Takemoto et al.

(10) Patent No.: US 10,837,373 B2
(45) Date of Patent: Nov. 17, 2020

(54) PRECOMBUSTION CHAMBER GAS ENGINE

(71) Applicant: MITSUBISHI HEAVY INDUSTRIES ENGINE & TURBOCHARGER, LTD., Sagamihara (JP)

(72) Inventors: Daisuke Takemoto, Tokyo (JP); Akihiro Yuuki, Tokyo (JP); Yuuta Furukawa, Sagamihara (JP); Kazuo Ogura, Sagamihara (JP); Hiroyuki Endo, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 16/465,368

(22) PCT Filed: Jan. 24, 2018

(86) PCT No.: PCT/JP2018/002147
§ 371 (c)(1),
(2) Date: May 30, 2019

(87) PCT Pub. No.: WO2018/139491
PCT Pub. Date: Aug. 2, 2018

(65) Prior Publication Data
US 2019/0390613 A1    Dec. 26, 2019

(30) Foreign Application Priority Data

Jan. 26, 2017    (JP) .................................. 2017-012073

(51) Int. Cl.
*F02D 41/02*    (2006.01)
*F02D 19/02*    (2006.01)
(Continued)

(52) U.S. Cl.
CPC ............ *F02D 19/02* (2013.01); *F02D 23/02* (2013.01); *F02B 19/1023* (2013.01);
(Continued)

(58) Field of Classification Search
CPC .. F02B 19/1023; F02B 19/1061; F02D 19/02; F02D 19/022; F02D 19/027;
(Continued)

(56) References Cited

U.S. PATENT DOCUMENTS

| | | | | |
|---|---|---|---|---|
| 2015/0000635 A1* | 1/2015 | Nishio | ..................... | F02D 35/02 123/332 |
| 2015/0233280 A1* | 8/2015 | Ernst | ....................... | F02B 43/00 60/605.1 |

(Continued)

FOREIGN PATENT DOCUMENTS

| | | |
|---|---|---|
| EP | 1566533 A1 | 8/2005 |
| EP | 2518299 A1 | 10/2012 |

(Continued)

OTHER PUBLICATIONS

JP 2007270782 A translation, Published 2007.*

(Continued)

*Primary Examiner* — George C Jin
*Assistant Examiner* — Teuta B Holbrook
(74) *Attorney, Agent, or Firm* — Birch, Stewart, Kolasch & Birch, LLP

(57) ABSTRACT

A precombustion chamber gas engine including a precombustion chamber communicating with a main combustion chamber includes: a precombustion-chamber-fuel supply line through which a precombustion chamber fuel flows; a precombustion-chamber-fuel supply valve connected to the precombustion-chamber-fuel supply line and controlling supply of the precombustion chamber fuel to the precom- (Continued)

bustion chamber, the precombustion-chamber-fuel supply valve being configured to open when a precombustion chamber fuel line pressure, which is a pressure of the precombustion-chamber-fuel supply line, is larger than a precombustion chamber pressure, which is a pressure of the precombustion chamber; a precombustion-chamber-fuel-line-pressure adjustment valve disposed on the precombustion-chamber-fuel supply line and capable of adjusting the precombustion chamber fuel line pressure; an exhaust-precombustion-chamber-pressure acquisition unit capable of obtaining an exhaust precombustion chamber pressure which is a pressure related to the precombustion chamber pressure when an exhaust valve controlling a communication state between an exhaust passage and a cylinder forming the main combustion chamber is open; and a valve-opening-degree control device configured to control an opening degree of the precombustion-chamber-fuel-line-pressure adjustment valve. The valve-opening-degree control device is configured to control the opening degree of the precombustion-chamber-fuel-line-pressure adjustment valve in accordance with the exhaust precombustion chamber pressure obtained by the exhaust-precombustion-chamber-pressure acquisition unit.

10 Claims, 7 Drawing Sheets

(51) Int. Cl.
  *F02D 23/02* (2006.01)
  *F02B 19/10* (2006.01)
  *F02M 21/02* (2006.01)
(52) U.S. Cl.
  CPC ...... *F02D 41/02* (2013.01); *F02D 2200/0406* (2013.01); *F02M 21/0284* (2013.01)
(58) Field of Classification Search
  CPC ............. F02D 2200/0406; F02D 23/02; F02D 35/024; F02D 41/0027; F02D 41/02; F02D 41/1448; F02M 21/0284
  See application file for complete search history.

(56) References Cited

U.S. PATENT DOCUMENTS

| | | | |
|---|---|---|---|
| 2016/0010538 A1* | 1/2016 | Suzuki | ................ F02B 19/12 123/292 |
| 2016/0245151 A1 | 8/2016 | Yuuki et al. | |

FOREIGN PATENT DOCUMENTS

| | | | |
|---|---|---|---|
| JP | 8-232664 A | | 9/1996 |
| JP | 9-268915 A | | 10/1997 |
| JP | 2002-317664 A | | 10/2002 |
| JP | 2007-270782 A | | 10/2007 |
| JP | 2007270782 A | * | 10/2007 |
| JP | 2009-221937 A | | 10/2009 |
| JP | 2010265835 A | * | 11/2010 |
| JP | 2012-172657 A | | 9/2012 |
| WO | WO 2015/060236 A1 | | 4/2015 |

OTHER PUBLICATIONS

International Search Report for International Application No. PCT/JP2018/002147, dated Mar. 6, 2018.
Written Opinion of the International Searching Authority for International Application No. PCT/JP2018/002147, dated Mar. 6, 2018, with English translation.
Office Action dated Apr. 21, 2020 issued in counterpart Japanese Application No. 2017-012073 with an English Translation.
Extended European Search Report, dated Jan. 30, 2020, for European Application No. 18744967.3.
Office Action dated Sep. 8, 2020 issued in counterpart Japanese Application No. 2017-012073 with an English Translation.

* cited by examiner

PRECOMBUSTION CHAMBER GAS ENGINE

TECHNICAL FIELD

The present disclosure relates to a precombustion chamber gas engine including a precombustion chamber communicating with a main combustion chamber and particularly relates to control of a precombustion chamber fuel directly supplied to a precombustion chamber.

BACKGROUND ART

A precombustion chamber gas engine has been known as a gas engine enabling efficient combustion of a lean premixed gas (for instance, Patent Documents 1 and 2). The precombustion chamber gas engine includes a main combustion chamber (main chamber) defined between a piston and a cylinder head and a precombustion chamber disposed adjacent to the main combustion chamber, for instance above the cylinder. The main combustion chamber communicates with the precombustion chamber via a plurality of nozzles. By igniting an air-fuel mixture in the precombustion chamber with an ignition device such as an ignition plug, combustion flame is generated and ejected via each of the nozzles disposed at a lower portion of the precombustion chamber, by which a lean premixed gas is combusted in the main combustion chamber. More specifically, a part of a lean premixed gas introduced into the cylinder during the intake stroke of the engine flows into the precombustion chamber via each of the nozzles during the compression stroke and is mixed with a precombustion chamber fuel directly supplied to the precombustion chamber via a precombustion-chamber-fuel supply valve, so that an air-fuel mixture having a concentration suitable for ignition is generated in the precombustion chamber. When the air-fuel mixture in this state is ignited with the ignition device, the combustion flame is injected from the precombustion chamber to the cylinder and serves as a torch to ignite and combust the lean premixed gas in the main combustion chamber. This allows combustion of the lean fuel in the main combustion chamber, thus enabling low fuel consumption (high efficiency). Further, since combustion of the lean premixed gas in the main combustion chamber is performed at a relatively low temperature, generation of NOx is reduced, and low pollution can be achieved.

For instance in Patent Documents 1 and 2, the supply timing and the supply amount of the precombustion chamber fuel via the precombustion-chamber-fuel supply valve are passively determined in accordance with the differential pressure between the pressure (precombustion chamber fuel line pressure) of a precombustion-chamber-fuel supply line, through which the precombustion chamber fuel is sent to the precombustion-chamber-fuel supply valve, and the pressure (precombustion chamber pressure) of the precombustion chamber. Specifically, the precombustion-chamber-fuel supply valve opens when the precombustion chamber fuel line pressure is larger than the precombustion chamber pressure, and, with opening of the valve, the precombustion chamber fuel is supplied from the precombustion-chamber-fuel supply valve to the precombustion chamber. In Patent Documents 1 and 2, the differential pressure between the precombustion chamber fuel line pressure and the pressure (intake pressure) in an intake pipe is adjusted to a desired value to supply the precombustion chamber fuel. Through such a differential pressure control to adjust the differential pressure between the precombustion chamber fuel line pressure and the intake pressure to be a target value, the supply amount of the precombustion chamber fuel during air intake is controlled.

In case of using this type of precombustion-chamber-fuel supply valve, the pressure in the cylinder becomes high during the compression and combustion strokes, and the pressure in the precombustion chamber communicating with the main combustion chamber also becomes high. Accordingly, the precombustion chamber fuel is not supplied to the precombustion chamber. The precombustion chamber fuel is supplied at the timing of the intake stroke or the exhaust stroke where the precombustion chamber fuel line pressure can be higher than the precombustion chamber pressure. At this time, in the intake stroke, the intake pressure varies with operational conditions of the engine, such as the output power and the rotational speed of the engine. By this means, in Patent Documents 1 and 2, the supply amount of the precombustion chamber fuel is controlled appropriately.

CITATION LIST

Patent Literature

Patent Document 1: JP 2002-317664 A
Patent Document 2: JP 2012-172657 A

SUMMARY

Problems to be Solved

However, in a precombustion chamber gas engine including an exhaust turbine supercharger, the exhaust pressure can change in short term or long term for some reasons, for instance, when the flow rate of exhaust gas passing through an exhaust bypass passage, which bypasses a turbine of the supercharger, changes or when the temperature (suction temperature) of exhaust gas flowing into the supercharger changes due to season change. Further, since the precombustion chamber pressure also changes with change in the exhaust pressure, if the exhaust pressure changes, the precombustion chamber fuel is passively supplied from the precombustion-chamber-fuel supply valve to the precombustion chamber or stopped in response to the change in the exhaust pressure (precombustion chamber pressure). That is, the amount of the precombustion chamber fuel supplied to the precombustion chamber per combustion cycle can become excessive or insufficient due to the change of the precombustion chamber fuel supplied during the exhaust stroke. Such change in the supply amount of the precombustion chamber fuel and change in the air excess rate of the precombustion chamber at ignition accompanying it cause excessive combustion or misfire in the main combustion chamber, which causes damage or reduction in engine efficiency.

In view of the above, an object of at least one embodiment of the present invention is to provide a precombustion chamber gas engine capable of supplying an appropriate amount of precombustion chamber fuel to a precombustion chamber even in a case where the exhaust pressure changes.

Solution to the Problems (1) According to at least one embodiment of the present invention, a precombustion chamber gas engine including a precombustion chamber communicating with a main combustion chamber comprises: a precombustion-chamber-fuel supply line through which a precombustion chamber fuel flows; a precombustion-chamber-fuel supply valve connected to the precombustion-chamber-fuel supply line and controlling supply of the precombustion chamber fuel to the precombustion chamber, the precombustion-chamber-fuel supply valve being configured to open when a precombustion chamber fuel line pressure, which is a pressure of the precombustion-chamber-fuel supply line, is larger than a precombustion chamber pressure, which is a pressure of the precombustion chamber; a precombustion-chamber-fuel-line-pressure adjustment valve disposed on the precombustion-chamber-fuel supply line and capable of adjusting the precombustion chamber fuel line pressure; an exhaust-precombustion-chamber-pressure acquisition unit capable of obtaining an exhaust precombustion chamber pressure which is a pressure related to the precombustion chamber pressure when an exhaust valve controlling a communication state between an exhaust passage and a cylinder forming the main combustion chamber is open; and a valve-opening-degree control device configured to control an opening degree of the precombustion-chamber-fuel-line-pressure adjustment valve, wherein the valve-opening-degree control device is configured to control the opening degree of the precombustion-chamber-fuel-line-pressure adjustment valve in accordance with the exhaust precombustion chamber pressure obtained by the exhaust-precombustion-chamber-pressure acquisition unit.

With the above configuration (1), while the precombustion chamber fuel is supplied from the precombustion-chamber-fuel supply valve to the precombustion chamber when the pressure (precombustion chamber fuel line pressure) of the precombustion-chamber-fuel supply line is larger than the pressure (precombustion chamber pressure) of the precombustion chamber, the valve-opening-degree control device is configured to control the opening degree of the precombustion-chamber-fuel-line-pressure adjustment valve in accordance with a pressure (exhaust precombustion chamber pressure) related to the precombustion chamber when the exhaust valve is open (hereinafter, referred to as "during exhaust"), for instance during the exhaust stroke, to adjust the precombustion chamber fuel line pressure. Thus, by controlling the precombustion chamber fuel line pressure in accordance with the exhaust precombustion chamber pressure, it is possible to control, during exhaust, the supply amount of the precombustion chamber fuel from the precombustion-chamber-fuel supply valve, which opens (supplies the fuel) when the precombustion chamber fuel line pressure is larger than the precombustion chamber pressure.

Thereby, it is possible to adjust the supply amount of the precombustion chamber fuel to the precombustion chamber per combustion cycle to be a desired amount for forming an air-fuel mixture suitable for ignition in the precombustion chamber, for instance. Thus, it is possible to avoid excess or insufficiency of the supply amount of the precombustion chamber fuel per combustion cycle, and it is possible to prevent degradation in efficiency due to excessive combustion or misfire or the like caused by excess or insufficiency of the supply amount of the precombustion chamber fuel to the precombustion chamber, or damage to the precombustion chamber fuel.

(2) In some embodiments, in the above configuration (1), the valve-opening-degree control device is configured to control the opening degree of the precombustion-chamber-fuel-line-pressure adjustment valve so that the precombustion chamber fuel line pressure increases when the exhaust precombustion chamber pressure increases, and the valve-opening-degree control device is configured to control the opening degree of the precombustion-chamber-fuel-line-pressure adjustment valve so that the precombustion chamber fuel line pressure decreases when the exhaust precombustion chamber pressure decreases.

With the above configuration (2), the valve-opening-degree control device controls the opening degree of the precombustion-chamber-fuel-line-pressure adjustment valve in accordance with change in the exhaust pressure so as to counteract change in the differential pressure between the precombustion chamber fuel line pressure and the precombustion chamber pressure caused by the change in the exhaust pressure during exhaust. Thereby, it is possible to prevent the precombustion chamber fuel from being supplied excessively or insufficiently from the precombustion-chamber-fuel supply valve during exhaust.

(3) In some embodiments, in the above configuration (2), the precombustion chamber gas engine further comprises a precombustion-chamber-fuel-line-pressure detection unit for detecting the precombustion chamber fuel line pressure of the precombustion-chamber-fuel supply line, wherein the valve-opening-degree control device is configured to control the opening degree of the precombustion-chamber-fuel-line-pressure adjustment valve so that a differential pressure between the precombustion chamber fuel line pressure detected by the precombustion-chamber-fuel-line-pressure detection unit and the exhaust precombustion chamber pressure obtained by the exhaust-precombustion-chamber-pressure acquisition unit is equal to a target differential pressure.

With the above configuration (3), during exhaust, the differential pressure between the precombustion chamber fuel line pressure and the precombustion chamber pressure (exhaust precombustion chamber pressure) is controlled to be equal to the target differential pressure. Thereby, it is possible to control the supply amount of the precombustion chamber fuel from the precombustion-chamber-fuel supply valve, which opens (supplies the fuel) when the precombustion chamber fuel line pressure is larger than the precombustion chamber pressure, to be a desired amount, during exhaust.

(4) In some embodiments, in the above configuration (3), the precombustion chamber gas engine further comprises: a turbocharger including a turbine rotationally driven by an exhaust gas flowing through the exhaust passage; and an exhaust bypass valve disposed on an exhaust bypass passage allowing the exhaust gas to bypass the turbine, the exhaust bypass valve being capable of controlling a flow rate of the exhaust gas flowing through the exhaust bypass passage.

With the above configuration (4), even in a case where the exhaust pressure changes with change in the opening degree of the exhaust bypass valve disposed on the exhaust bypass passage, by controlling the precombustion chamber fuel line pressure in accordance with change in the exhaust pressure, it is possible to control the supply amount of the precombustion chamber fuel from the precombustion-chamber-fuel supply valve, which opens (supplies the fuel) when the precombustion chamber fuel line pressure is larger than the precombustion chamber pressure, to be a desired amount, during exhaust.

(5) In some embodiments, in the above configuration (3) or (4), the precombustion chamber gas engine further comprises an intake-precombustion-chamber-pressure detection unit for obtaining the precombustion chamber pressure, the intake-precombustion-chamber-pressure detection unit being capable of obtaining an intake precombustion chamber pressure which is a pressure related to the precombustion chamber pressure when an intake valve controlling a communication state between an intake passage and the cylinder is open. The valve-opening-degree control device is configured to control the opening degree of the precombustion-chamber-fuel-line-pressure adjustment valve so that a differential pressure between the precombustion chamber fuel line pressure detected by the precombustion-chamber-fuel-line-pressure detection unit and the intake precombustion chamber pressure obtained by the intake-precombustion-chamber-pressure detection unit is equal to a target differential pressure.

With the above configuration (5), the valve-opening-degree control device is configured to control the opening degree of the precombustion-chamber-fuel-line-pressure adjustment valve in accordance with a pressure (intake precombustion chamber pressure) related to the precombustion chamber when the intake valve is open (hereinafter, referred to as "during intake"), for instance during the intake stroke, to adjust the pressure (precombustion chamber fuel line pressure) of the precombustion-chamber-fuel supply line. More specifically, during intake, the opening degree of the precombustion-chamber-fuel-line-pressure adjustment valve is controlled so that the differential pressure between the precombustion chamber fuel line pressure and the intake precombustion chamber pressure is equal to the target differential pressure. Thereby, it is possible to control, not only during exhaust but also during intake, the supply amount of the precombustion chamber fuel from the precombustion-chamber-fuel supply valve, which opens (supplies the fuel) when the precombustion chamber fuel line pressure is larger than the precombustion chamber pressure, to be a desired amount.

In this way, by controlling the supply amount of the precombustion chamber fuel from the precombustion-chamber-fuel supply valve not only during exhaust but also during intake, it is possible to more reliably supply a desired amount of the precombustion chamber fuel to the precombustion chamber in each combustion cycle. Thereby, it is possible to more reliably prevent the supply amount of the precombustion chamber fuel to the precombustion chamber from becoming excessive or insufficient during the combustion stroke.

(6) In some embodiments, in the above configuration (5), the valve-opening-degree control device includes: a target-differential-pressure calculation section for calculating the target differential pressure which is a target of the differential pressure between the precombustion chamber fuel line pressure and the exhaust precombustion chamber pressure, based on an engine rotational speed, the intake precombustion chamber pressure, and the exhaust precombustion chamber pressure; and a valve-opening-degree adjustment section for adjusting the opening degree of the precombustion-chamber-fuel-line-pressure adjustment valve so that the differential pressure is equal to the target differential pressure.

With the above configuration (6), since the valve-opening-degree control device includes the target-differential-pressure calculation section and the valve-opening-degree adjustment section, it is possible perform control so that the differential pressure between the precombustion chamber fuel line pressure and the precombustion chamber pressure (exhaust precombustion chamber pressure) is equal to the target differential pressure, during exhaust.

(7) In some embodiments, in the above configuration (6), the target-differential-pressure calculation section includes: a reference-value calculation part for calculating a reference value of the target differential pressure, based on the engine rotational speed and the intake precombustion chamber pressure; a correction-value calculation part for calculating a correction value for correcting the reference value, based on the intake precombustion chamber pressure and the exhaust precombustion chamber pressure; and a computation part for calculating the target differential pressure, based on the reference value and the correction value.

With the above configuration (7), the target-differential-pressure calculation section is configured to calculate the target differential pressure by correcting the reference value calculated based on the engine rotational speed and the intake precombustion chamber pressure with the correction value calculated based on the intake precombustion chamber pressure and the exhaust precombustion chamber pressure. Thereby, in a case where control of the supply amount of the precombustion chamber fuel based on the target differential pressure during intake is already performed based on the engine rotational speed and the intake precombustion chamber pressure, it is possible to easily add control of the target differential pressure during exhaust.

(8) In some embodiments, in any one of the above configurations (5) to (7), the intake-precombustion-chamber-pressure detection unit is a pressure measurement unit capable of obtaining a pressure by measurement.

With the above configuration (8), the intake precombustion chamber pressure can be obtained by measurement with the pressure measurement unit such as a pressure sensor.

(9) In some embodiments, in the above configuration (8), the pressure measurement unit is configured to detect a pressure of an intake manifold forming a part of the intake passage.

With the above configuration (9), the pressure of the intake manifold is measured by the pressure measurement unit. The precombustion chamber and the intake manifold are in communication during intake when the intake valve is open. Thus, by measuring the pressure of the intake manifold, the intake precombustion chamber pressure can be obtained.

(10) In some embodiments, in any one of the above configurations (5) to (7), the intake-precombustion-chamber-pressure detection unit is configured to obtain the intake precombustion chamber pressure by estimation.

With the above configuration (10), the precombustion chamber pressure is estimated based on, for instance, operational conditions of the precombustion chamber gas engine such as the output power of the precombustion chamber gas engine, the fuel flow rate, the air flow rate measured or calculated from the volumetric efficiency. Thereby, the intake precombustion chamber pressure can be obtained by estimation without providing a pressure measurement unit such as a sensor.

(11) In some embodiments, in any one of the above configurations (1) to (10), the exhaust-precombustion-chamber-pressure acquisition unit is a pressure measurement unit capable of obtaining a pressure by measurement.

With the above configuration (11), the exhaust precombustion chamber pressure can be obtained by measurement with the pressure measurement unit such as a pressure sensor.

(12) In some embodiments, in the above configuration (1), the pressure measurement unit is configured to detect a pressure of an exhaust manifold forming a part of the exhaust passage.

With the above configuration (12), the pressure of the exhaust manifold is measured by the pressure measurement unit. The precombustion chamber and the exhaust manifold are in communication during exhaust when the exhaust valve is open. Thus, by measuring the pressure of the exhaust manifold, the exhaust precombustion chamber pressure can be obtained.

(13) In some embodiments, in any one of the above configurations (1) to (10), the exhaust-precombustion-chamber-pressure acquisition unit is configured to obtain the exhaust precombustion chamber pressure by estimation.

With the above configuration (13), for instance, a relationship between the exhaust bypass opening degree of the exhaust bypass valve and the exhaust pressure is obtained in advance through experiment, and the precombustion chamber pressure is estimated based on a command value of the exhaust bypass opening degree of the exhaust bypass valve which changes the exhaust pressure. Thereby, the exhaust precombustion chamber pressure can be obtained by estimation without providing a pressure measurement unit such as a sensor.

Advantageous Effects

According to at least one embodiment of the present invention, there is provided a precombustion chamber gas engine capable of supplying an appropriate amount of precombustion chamber fuel to a precombustion chamber even in a case where the exhaust pressure changes.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
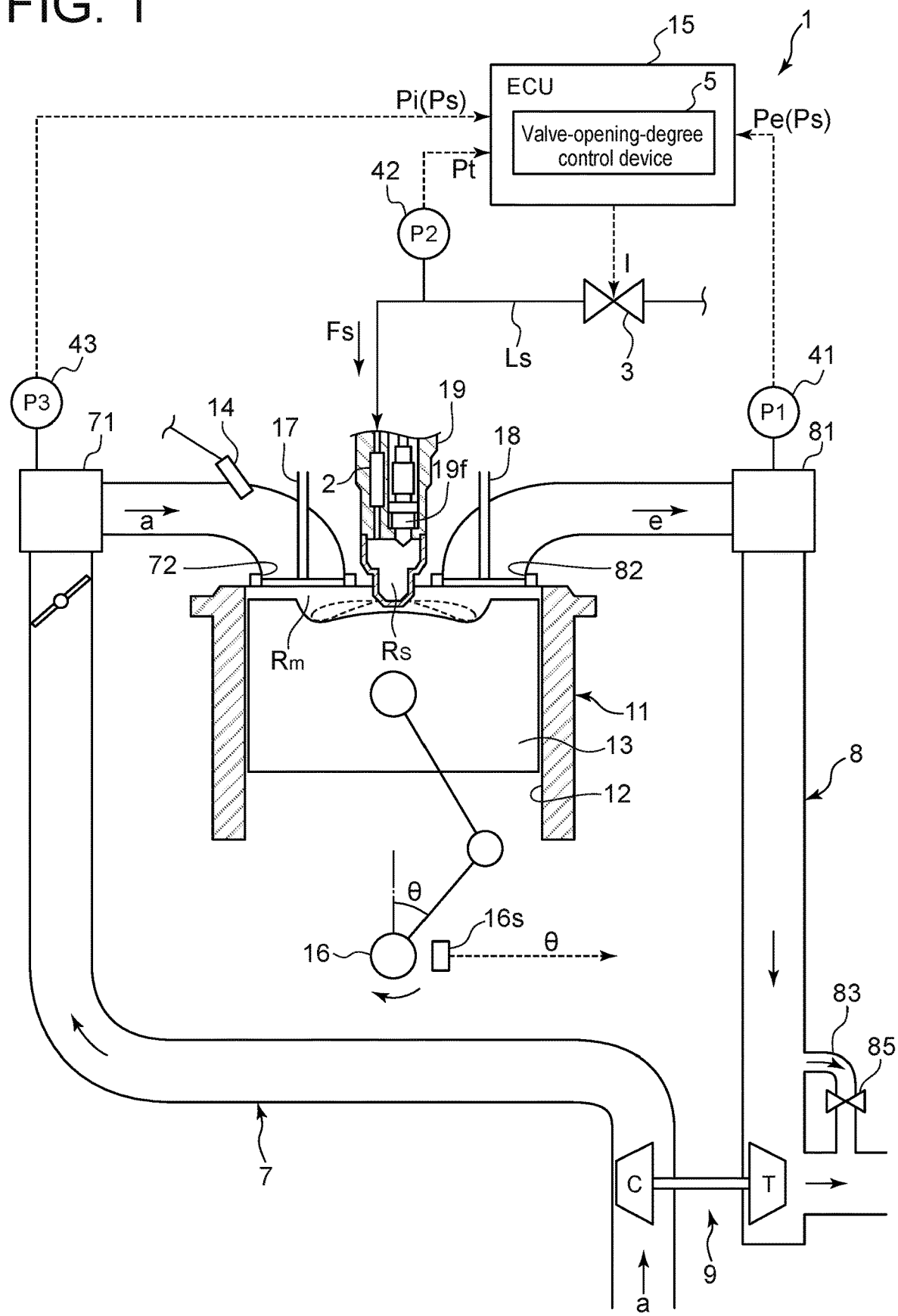
FIG. 1 is a schematic configuration diagram of a precombustion chamber gas engine according to an embodiment of the present invention.
Figure 2:
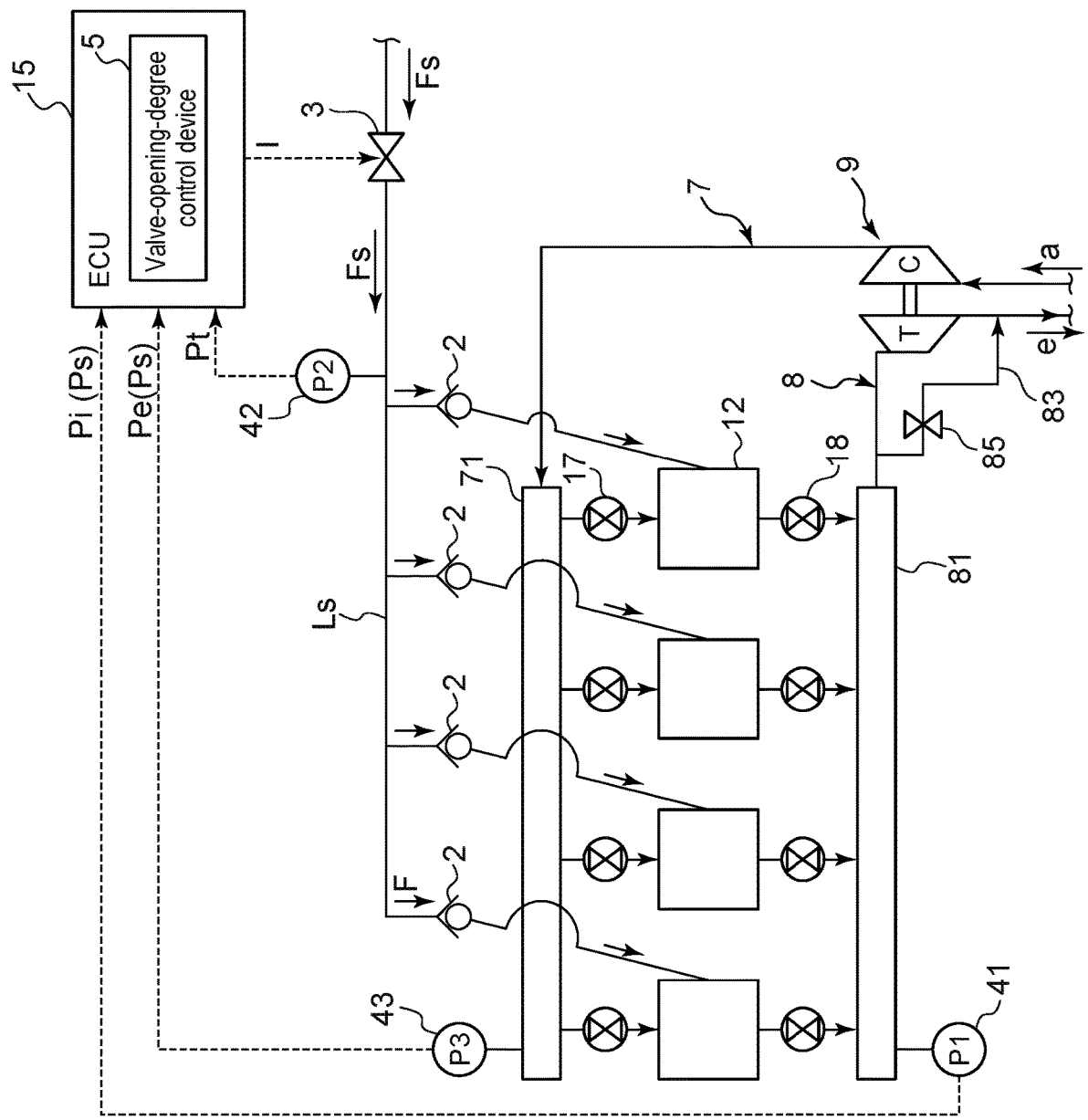
FIG. 2 is a schematic view of the precombustion chamber gas engine shown in FIG. 1.

FIG. 1 is a schematic configuration diagram of a precombustion chamber gas engine 1 according to an embodiment of the present invention. FIG. 2 is a schematic view of the precombustion chamber gas engine 1 shown in FIG. 1. As shown in FIGS. 1 and 2, the precombustion chamber gas engine 1 includes a precombustion-chamber-fuel supply line Ls, a precombustion-chamber-fuel supply valve 2, a precombustion-chamber-fuel-line-pressure adjustment valve 3, an exhaust-precombustion-chamber-pressure acquisition unit 41, and a valve-opening-degree control device 5.

The precombustion chamber gas engine 1 is an engine having a precombustion chamber Rs communicating with a main combustion chamber Rm, as shown in FIG. 1. The main combustion chamber Rm is a space defined between a cylinder 12 and an upper surface of a piston 13 in an engine body 11. The precombustion chamber Rs is a space formed inside a precombustion-chamber forming member 19 and communicates with the main combustion chamber Rm via a nozzle connecting the precombustion chamber Rs formed in the precombustion-chamber forming member 19 and the outside. The precombustion chamber gas engine 1 includes an intake passage 7 communicating with the main combustion chamber Rm via an intake port 72, an exhaust passage 8 communicating with the main combustion chamber Rm via an exhaust port 82, an intake valve 17 controlling a communication state between the main combustion chamber Rm and the intake passage 7, and an exhaust valve 18 controlling a communication state between the main combustion chamber Rm and the exhaust passage 8. The intake valve 17 and the exhaust valve 18 open and close the intake port 72 and the exhaust port 82 in accordance with a crank angle θ of a crank shaft 16 by a valve train (not shown).

In the embodiment shown in FIGS. 1 and 2, the precombustion chamber gas engine 1 is a multi-cylinder engine including a plurality of (e.g., four) cylinders 12 (see FIG. 2). As shown in FIGS. 1 and 2, the intake passage 7 includes an intake manifold 71 having branches for supplying intake air (air 'a') to be sucked into the main combustion chamber Rm to each of the cylinders 12. The exhaust passage 8 includes an exhaust manifold 81 collecting combustion gases (exhaust gas 'e') discharged from the cylinders 12. Each branch of the intake manifold 71 is provided with an injector 14. A fuel (hereinafter, main chamber fuel) injected from the injector 14 is mixed with the air 'a' flowing in the intake passage 7 to form an air-fuel mixture (lean premixed gas), and the air-fuel mixture is supplied to the main combustion chamber Rm. On the other hand, supply of a fuel (hereinafter, precombustion chamber fuel Fs) to the precombustion chamber Rs is directly performed by the precombustion-chamber-fuel supply valve 2 (described later). Then, combustion flame is generated by ignition of the fuel (precombustion chamber fuel Fs and lean premixed gas flowing from the main combustion chamber Rm) in the precombustion chamber Rs with an ignition device (in the present embodiment, ignition plug 19f) disposed in the precombustion-chamber forming member 19. This combustion flame is injected from the precombustion chamber Rs to the main combustion chamber Rm via a nozzle, so that the main chamber fuel (lean premixed gas) in the main combustion chamber Rm is combusted.

The precombustion-chamber-fuel supply line Ls is a line through which the precombustion chamber fuel Fs flows. The precombustion-chamber-fuel supply line Ls is connected to the precombustion-chamber-fuel supply valve 2 which controls supply of the precombustion chamber fuel Fs to the precombustion chamber Rs, and the precombustion chamber fuel Fs is supplied to the precombustion-chamber-fuel supply valve 2 therethrough. In the embodiment shown in FIGS. 1 and 2, the precombustion-chamber-fuel supply line Ls is a tubular member, and the precombustion chamber fuel Fs flows inside the tubular member.

The precombustion-chamber-fuel supply valve 2 opens when a pressure (hereinafter, precombustion chamber fuel line pressure Pt) caused by the precombustion chamber fuel Fs flowing through the precombustion-chamber-fuel supply line Ls is higher than the pressure (hereinafter, precombustion chamber pressure Ps) of the precombustion chamber Rs. Further, the precombustion-chamber-fuel supply valve 2 opens and is kept in an open state at an opening degree depending on the differential pressure D between the precombustion chamber fuel line pressure Pt and the precombustion chamber pressure Ps (hereinafter, simply referred to as differential pressure D, as appropriate). More specifically, in a case where the precombustion chamber fuel line pressure Pt is equal to or less than the precombustion chamber pressure Ps (Pt≤Ps), the precombustion-chamber-fuel supply valve 2 is kept in a closed state by a pressure due to the pressure differential (Ps−Pt≥0) or a force (tension) due to a spring or the like. In a case where the precombustion chamber fuel line pressure Pt is larger than the precombustion chamber pressure Ps (Pt>Ps) and the precombustion chamber fuel line pressure Pt becomes larger than the sum of the precombustion chamber pressure Ps and the tension, the precombustion-chamber-fuel supply valve 2 opens. That is, the precombustion-chamber-fuel supply valve 2 is configured to open and close in accordance with the differential pressure D. In the open state, the valve allows the precombustion chamber fuel Fs to flow into the precombustion chamber Rs; whereas in the closed state, the valve stops the flow in the opposite direction. In the embodiment shown in FIGS. 1 and 2, the precombustion chamber fuel Fs is supplied from the precombustion-chamber-fuel supply valve 2 to the precombustion chamber Rs in an amount necessary for producing an air-fuel mixture suitable for ignition in the precombustion chamber Rs in each combustion cycle, in accordance with operational conditions. While in the embodiment shown in FIGS. 1 and 2, the precombustion-chamber-fuel supply valve 2 is disposed inside the precombustion-chamber forming member 19, the present invention is not limited thereto. In some embodiments, the precombustion-chamber-fuel supply valve 2 may be disposed outside the precombustion-chamber forming member 19.

The precombustion-chamber-fuel-line-pressure adjustment valve 3 is a valve device disposed on the precombustion-chamber-fuel supply line Ls and capable of adjusting the precombustion chamber fuel line pressure Pt, and is configured to operate in accordance with a valve-opening-degree instruction I from the valve-opening-degree control device 5 described later. That is, the precombustion-chamber-fuel-line-pressure adjustment valve 3 increases or decreases the precombustion chamber fuel line pressure Pt and thereby adjusts the pressure differential relative to the precombustion chamber pressure Ps. Thereby, it is possible to adjust the differential pressure D between the precombustion chamber fuel line pressure Pt and the precombustion chamber pressure Ps. In the embodiment shown in FIGS. 1 and 2, as the opening degree of the precombustion-chamber-fuel-line-pressure adjustment valve 3 increases, the precombustion chamber fuel line pressure Pt increases; whereas as the opening degree of the precombustion-chamber-fuel-line-pressure adjustment valve 3 decreases, the precombustion chamber fuel line pressure Pt decreases.

The exhaust-precombustion-chamber-pressure acquisition unit 41 is a unit capable of obtaining a precombustion chamber pressure during exhaust, i.e., exhaust precombustion chamber pressure Pe, which is related to the precombustion chamber pressure Ps when the exhaust valve 18, controlling the communication state between the cylinder 12 forming the main combustion chamber Rm and the exhaust passage 8 as described above, is open. The exhaust precombustion chamber pressure Pe is, for instance, a pressure related to the pressure of the precombustion chamber Rs during the exhaust stroke, and if the exhaust valve 18 also opens during a stroke other than the exhaust stroke due to advancing the valve opening timing or the like, also includes the pressure during this period. Hereinafter, a period during which the exhaust valve 18 is open is referred to as "during exhaust". In the embodiment shown in FIGS. 1 and 2, the exhaust-precombustion-chamber-pressure acquisition unit 41 is, for instance, a pressure sensor (pressure gauge), which is a pressure measurement unit capable of obtaining the pressure by measurement. Further, for instance, the exhaust-precombustion-chamber-pressure acquisition unit 41 (pressure measurement unit) may be disposed on the exhaust passage 8, such as the exhaust manifold 81 which forms a part of the exhaust passage 8. When the exhaust valve 18 is open, the exhaust passage 8 communicates with the precombustion chamber Rs. Thus, by placing the pressure gauge or the like in an appropriate position (for instance, on the exhaust passage 81) in the exhaust passage 8, it is possible to obtain the pressure of the precombustion chamber Rs during exhaust while suppressing the increase in cost. During exhaust, the pressure of the exhaust manifold 81 may not strictly coincide with the precombustion chamber pressure Ps. However, the pressure of the exhaust manifold 81 is correlated to the precombustion chamber pressure Ps, and thus in the present embodiment, the pressure of the exhaust manifold 81 is regarded as the exhaust precombustion chamber pressure Pe. Considering pressure loss between the precombustion chamber Rs and the installation position of the exhaust-precombustion-chamber-pressure acquisition unit 41, a detection value of the exhaust-precombustion-chamber-pressure acquisition unit 41 may be corrected to be used as the exhaust precombustion chamber pressure Pe. Thereby, it is possible to improve the accuracy of the exhaust precombustion chamber pressure Pe. Alternatively, the exhaust-precombustion-chamber-pressure acquisition unit 41 (pressure measurement unit) may be disposed on the precombustion-chamber forming member 19 to directly obtain the pressure of the precombustion chamber Rs.

The valve-opening-degree control device 5 is configured to control the opening degree of the precombustion-chamber-fuel-line-pressure adjustment valve 3 described above. The valve-opening-degree control device 5 includes a computer such as an electronic control unit (ECU), which includes a CPU (processor, not depicted) and a memory (storage device) such as ROM and RAM. The CPU operates (e.g. computation of data) in accordance with program instructions loaded to a main storage device, and thereby functional parts are implemented. In the embodiment shown in FIGS. 1 and 2, the valve-opening-degree control device 5 is implemented as a functional part of an engine control ECU 15. However, the present invention is not limited to the above embodiment. In some embodiments, the valve-opening-degree control device 5 may be implemented in an electronic control device physically different from the engine control ECU 15, alone or in combination with other functional parts.

In the precombustion chamber gas engine 1 with the above configuration, since the precombustion-chamber-fuel supply valve 2 opens and closes in accordance with the differential pressure D between the precombustion chamber fuel line pressure Pt and the precombustion chamber pressure Ps, the supply timing and the supply amount of the precombustion chamber fuel Fs to the precombustion chamber Rs by the precombustion-chamber-fuel supply valve 2 are passively determined in accordance with the differential pressure D. In case of using such a precombustion-chamber-fuel supply valve 2, if the pressure (exhaust pressure) in the exhaust passage 8 changes for some reasons when the exhaust valve 18 is open, the precombustion chamber fuel Fs may be passively supplied from the precombustion-chamber-fuel supply valve 2 to the precombustion chamber Rs or stopped depending on the precombustion chamber pressure Ps which changes with change in the exhaust pressure. More specifically, when the exhaust pressure changes in the decreasing direction, the precombustion chamber pressure Ps decreases accordingly. Thus, the precombustion chamber fuel line pressure Pt becomes relatively higher than the precombustion chamber pressure Ps, and consequently, the precombustion-chamber-fuel supply valve 2 opens or increases the opening degree. As a result, the precombustion chamber fuel Fs is supplied to the precombustion chamber Rs in a larger amount than expected. Conversely, when the exhaust pressure changes in the increasing direction, the precombustion chamber pressure Ps increases accordingly. Thus, the precombustion chamber fuel line pressure Pt becomes relatively lower than the precombustion chamber pressure Ps, and consequently, the precombustion-chamber-fuel supply valve 2 closes or decreases the opening degree. As a result, the precombustion chamber fuel Fs is supplied to the precombustion chamber Rs in a smaller amount than expected.

That is, if the exhaust pressure changes during exhaust, the amount of the precombustion chamber fuel Fs supplied to the precombustion chamber Rs per combustion cycle can become excessive or insufficient. Generally, it is configured such that the precombustion chamber fuel Fs is supplied from the precombustion-chamber-fuel supply valve 2 to the precombustion chamber Rs in an optimum amount so as to have a concentration suitable for ignition in the precombustion chamber Rs. However, if the supply amount becomes excessive or insufficient with respect to the optimum amount of the precombustion chamber fuel Fs, the air excess rate also changes, which can cause excessive combustion or misfire. Further, if excessive combustion occurs in the main combustion chamber Rm due to the excessive supply amount of the precombustion chamber fuel Fs (decrease in air excess rate), or misfire occurs in the main combustion chamber Rm due to the insufficient supply amount (increase in air excess rate), the efficiency of the precombustion chamber gas engine 1 degrades. This can also cause damage to the precombustion chamber gas engine 1.

In view of this, the valve-opening-degree control device 5 is configured to control the opening degree of the precombustion-chamber-fuel-line-pressure adjustment valve 3, in accordance with the exhaust precombustion chamber pressure Pe obtained by the exhaust precombustion-chamber-pressure acquisition unit 41. As shown in FIGS. 1 and 2, the valve-opening-degree control device 5 is connected to the precombustion-chamber-fuel-line-pressure adjustment valve 3 so as to be able to control this valve, and is configured to transmit a valve-opening-degree instruction I to the precombustion-chamber-fuel-line-pressure adjustment valve 3 to control the opening degree of the precombustion-chamber-fuel-line-pressure adjustment valve 3. Further, the valve-opening-degree control device 5 is connected to the exhaust-precombustion-chamber-pressure acquisition unit 41 so that the exhaust precombustion chamber pressure Pe obtained by the exhaust-precombustion-chamber-pressure acquisition unit 41 is input thereto. Thereby, the valve-opening-degree control device 5 can control the opening degree of the precombustion-chamber-fuel-line-pressure adjustment valve 3, in accordance with the exhaust precombustion chamber pressure Pe.

More specifically, the valve-opening-degree control device 5 is configured to control the opening degree of the precombustion-chamber-fuel-line-pressure adjustment valve 3 so that the precombustion chamber fuel line pressure Pt increases when the exhaust precombustion chamber pressure Pe increases, and is configured to control the opening degree of the precombustion-chamber-fuel-line-pressure adjustment valve 3 so that the precombustion chamber fuel line pressure Pt decreases when the exhaust precombustion chamber pressure Pe decreases. That is, the valve-opening-degree control device 5 controls the opening degree of the precombustion-chamber-fuel-line-pressure adjustment valve 3 so as to counteract change in the differential pressure D (|Pt−Ps|) caused by the change in the exhaust pressure. Thereby, even if the exhaust pressure changes (see FIG. 5B described later), by controlling the precombustion chamber fuel line pressure Pt in accordance with the change in the exhaust pressure through control of the precombustion-chamber-fuel-line-pressure adjustment valve 3 (see FIG. 5C described later), the change in the differential pressure D between the precombustion chamber fuel line pressure Pt and the precombustion chamber pressure Ps can be controlled or reduced (see FIG. 5D described later). Thus, it is possible to prevent the precombustion chamber fuel Fs from being supplied excessively or insufficiently from the precombustion-chamber-fuel supply valve 2 during exhaust.

Figure 3:
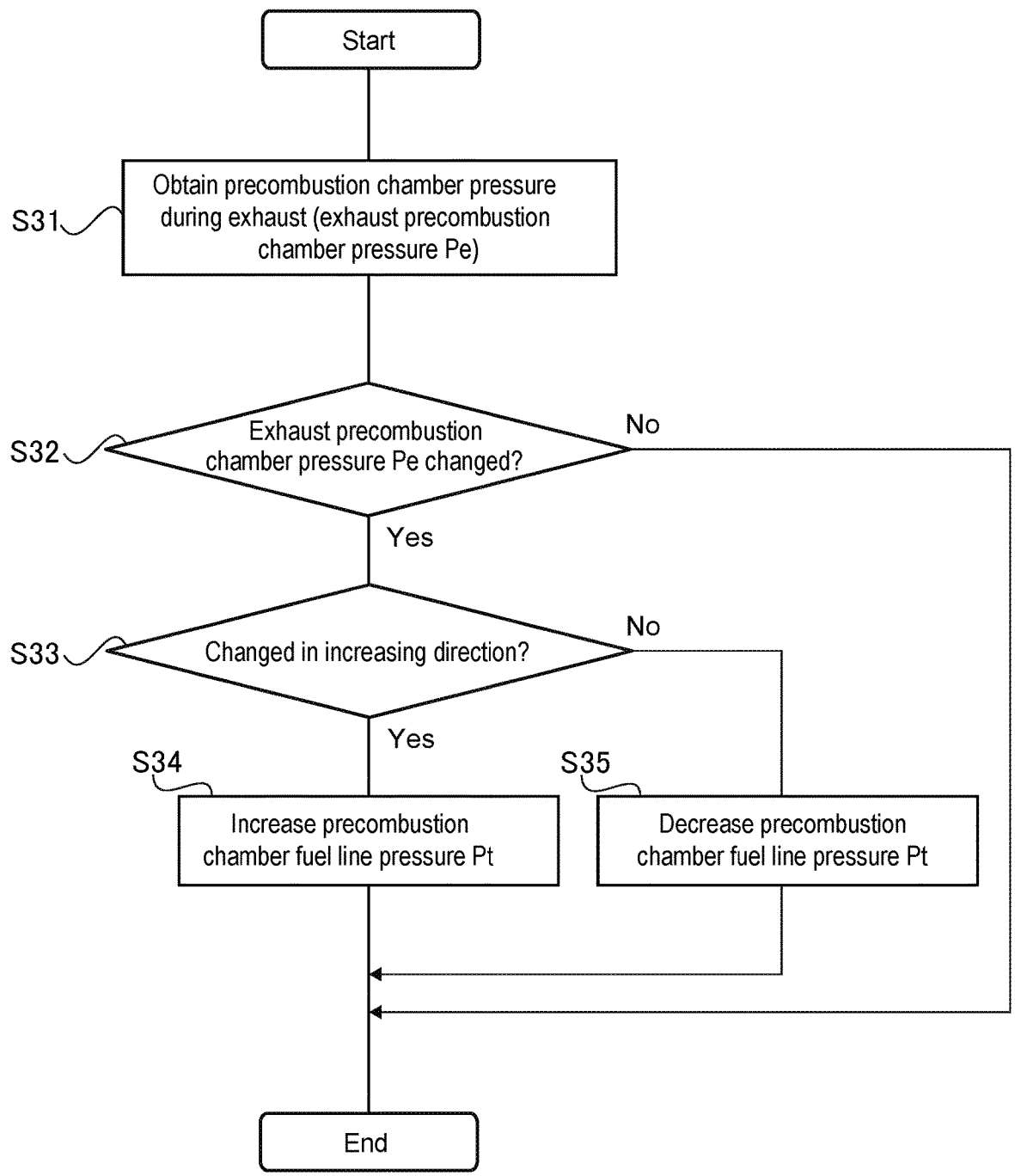
FIG. 3 is a diagram showing a control flow executed by a valve-opening-degree control device according to an embodiment of the present invention.

A control flow of the valve-opening-degree control device 5 will be described with reference to FIG. 3. FIG. 3 is a diagram showing a control flow (valve-opening-degree control method) executed by the valve-opening-degree control device 5 according to an embodiment of the present invention. This control flow is executed every time the exhaust precombustion chamber pressure Pe is input from the exhaust-precombustion-chamber-pressure acquisition unit 41.

In step S31 of FIG. 3, an exhaust-precombustion-chamber-pressure acquisition step is performed to obtain the exhaust precombustion chamber pressure Pe. In step S32, it is determined whether pressure change (pressure fluctuation) of the exhaust precombustion chamber pressure Pe occurs, and if it is determined that pressure change of the exhaust precombustion chamber pressure Pe does not occur, the flow of FIG. 3 ends.

Conversely, in step S32, if it is determined that pressure change of the exhaust precombustion chamber pressure Pe occurs, in step S33, a pressure change direction determination step is performed to determine whether the exhaust precombustion chamber pressure Pe increases. If it is determined that the exhaust precombustion chamber pressure Pe changes in the increasing direction, in step S34, a precombustion-chamber-fuel-line-pressure increase step is performed to increase the precombustion chamber fuel line pressure Pt. Conversely, in step S33, if it is determined that the exhaust precombustion chamber pressure Pe changes in the decreasing direction, in step S35, a precombustion-chamber-fuel-line-pressure decrease step is performed to decrease the precombustion chamber fuel line pressure Pt.

With the above configuration, while the precombustion chamber fuel Fs is supplied from the precombustion-chamber-fuel supply valve 2 to the precombustion chamber Rs when the precombustion chamber fuel line pressure Pt is larger than the precombustion chamber pressure Ps, the valve-opening-degree control device 5 is configured to control the opening degree of the precombustion-chamber-fuel-line-pressure adjustment valve 3 in accordance with the exhaust precombustion chamber pressure Pe to adjust the precombustion chamber fuel line pressure Pt. Thus, by controlling the precombustion chamber fuel line pressure Pt in accordance with the exhaust precombustion chamber pressure Pe, it is possible to control, during exhaust, the supply amount of the precombustion chamber fuel Fs from the precombustion-chamber-fuel supply valve 2 which opens (supplies the fuel) when the precombustion chamber fuel line pressure Pt is larger than the precombustion chamber pressure Ps.

Thereby, it is possible to adjust the supply amount of the precombustion chamber fuel Fs to the precombustion chamber Rs per combustion cycle to be a desired amount for forming an air-fuel mixture suitable for ignition in the precombustion chamber Rs, for instance. Thus, it is possible to avoid excess or insufficiency of the supply amount of the precombustion chamber fuel Fs per combustion cycle, and it is possible to prevent degradation in efficiency due to excessive combustion or misfire or the like caused by excess or insufficiency of the supply amount of the precombustion chamber fuel Fs to the precombustion chamber Rs, or damage to the precombustion chamber gas engine 1.

Further, in some embodiments, as shown in FIGS. 1 and 2, the precombustion chamber gas engine 1 may further include a precombustion-chamber-fuel-line-pressure detection unit 42 for detecting the precombustion chamber fuel line pressure Pt of the precombustion-chamber-fuel supply line Ls. Further, the valve-opening-degree control device 5 is configured to control the opening degree of the precombustion-chamber-fuel-line-pressure adjustment valve 3 so that the differential pressure D between the precombustion chamber fuel line pressure Pt detected by the precombustion-chamber-fuel-line-pressure detection unit 42 and the exhaust precombustion chamber pressure Pe obtained by the exhaust-precombustion-chamber-pressure acquisition unit 41 is equal to a target differential pressure Dt. In the embodiment shown in FIGS. 1 and 2, the precombustion-chamber-fuel-line-pressure detection unit 42 is, for instance, a pressure gauge disposed downstream (on the side closer to the precombustion chamber Rs) of the precombustion-chamber-fuel-line-pressure adjustment valve 3 in the precombustion-chamber-fuel supply line Ls and upstream of the precombustion-chamber-fuel supply valve 2. Further, the precombustion-chamber-fuel-line-pressure detection unit 42 is connected to the valve-opening-degree control device 5 so that the detected precombustion chamber fuel line pressure Pt is input into the valve-opening-degree control device 5.

Further, the valve-opening-degree control device 5 is configured to calculate a difference between the precombustion chamber fuel line pressure Pt input from the precombustion-chamber-fuel-line-pressure detection unit 42 and the exhaust precombustion chamber pressure Pe input from the exhaust-precombustion-chamber-pressure acquisition unit 41, and execute control of the opening degree of the precombustion-chamber-fuel-line-pressure adjustment valve 3, based on comparison between the calculated value and the target differential pressure Dt during exhaust stored in the memory.

Figure 4:
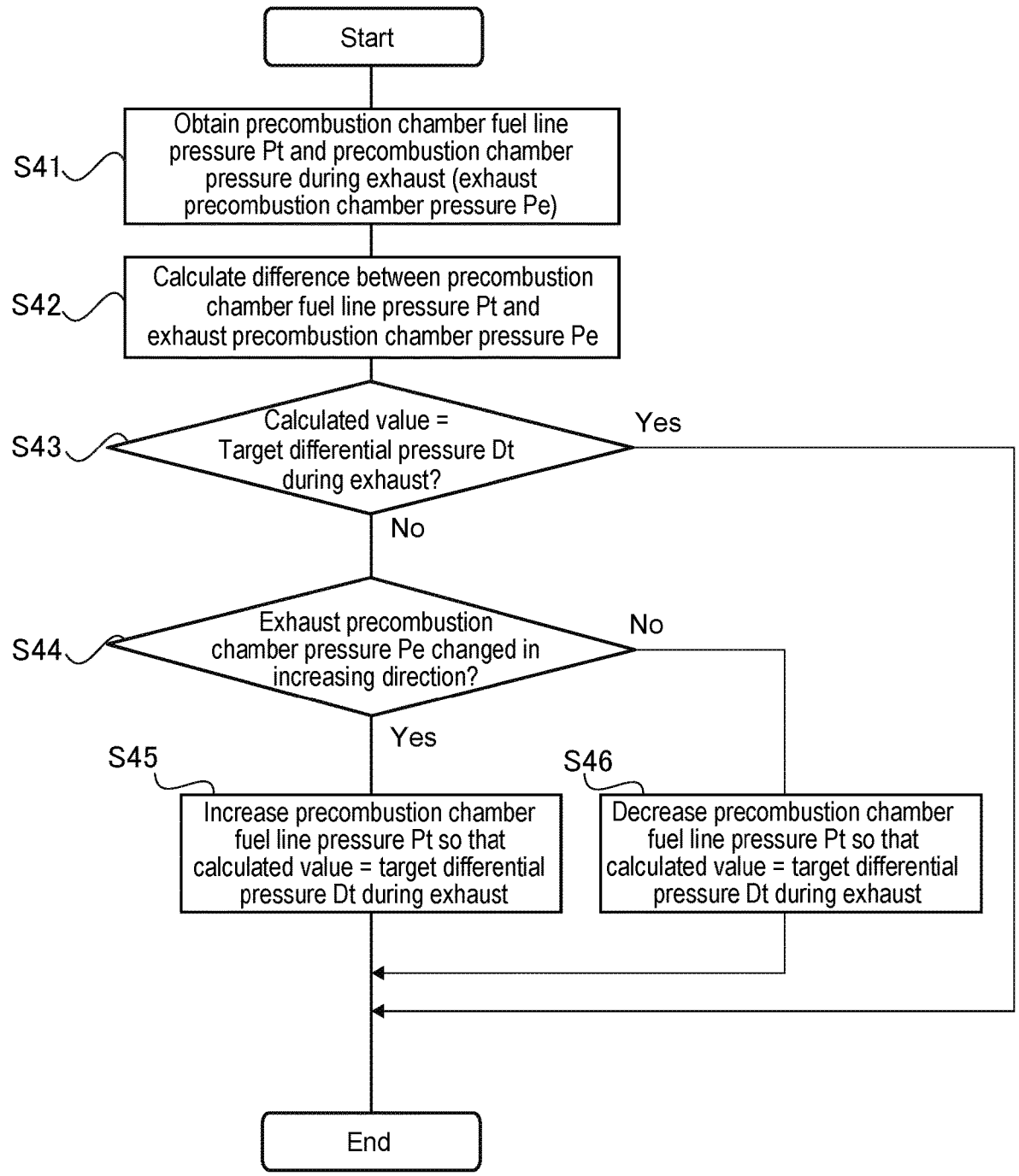
FIG. 4 is a diagram showing a differential pressure control flow during exhaust executed by a valve-opening-degree control device according to an embodiment of the present invention.

A control flow of the valve-opening-degree control device 5 will be described with reference to FIG. 4. FIG. 4 is a diagram showing a control flow (valve-opening-degree control method) during exhaust executed by the valve-opening-degree control device 5 according to an embodiment of the present invention. This control flow is executed every time the exhaust precombustion chamber pressure Pe is input from the exhaust-precombustion-chamber-pressure acquisition unit 41.

In step S41 of FIG. 4, a pressure acquisition step is performed to obtain the exhaust precombustion chamber pressure Pe and the precombustion chamber fuel line pressure Pt. In step S42, a difference between the precombustion chamber fuel line pressure Pt and the exhaust precombustion chamber pressure Pe is calculated. Then, in step S43, the calculated value in step S42 and the target differential pressure Dt during exhaust are compared, and if it is determined that the calculated value is equal to the target differential pressure Dt during exhaust, the flow of FIG. 3 ends. At this time, if the difference between the calculated value and the target differential pressure Dt is within a predetermined range, it may be determined that both are equal.

Conversely, in step S43, if it is determined that the calculated value is not equal to the target differential pressure Dt during exhaust, in step S44, a pressure change direction determination step is performed to determine whether the exhaust precombustion chamber pressure Pe increases. If it is determined that the exhaust precombustion chamber pressure Pe changes in the increasing direction, in step S45, a precombustion-chamber-fuel-line-pressure increase step is performed to increase the precombustion chamber fuel line pressure Pt so that the calculated value is determined to be equal to the target differential pressure Dt during exhaust. Conversely, in step S44, if it is determined that the exhaust precombustion chamber pressure Pe changes in the decreasing direction, in step S46, a precombustion-chamber-fuel-line-pressure decrease step is performed to decrease the precombustion chamber fuel line pressure Pt so that the calculated value is determined to be equal to the target differential pressure Dt during exhaust.

With the above configuration, during exhaust, the opening degree of the precombustion-chamber-fuel-line-pressure adjustment valve is controlled so that the differential pressure D between the precombustion chamber fuel line pressure Pt and the precombustion chamber pressure Ps (exhaust precombustion chamber pressure Pe) is equal to the target differential pressure Dt. Thereby, it is possible to control, during exhaust, the supply amount of the precombustion chamber fuel Fs from the precombustion-chamber-fuel supply valve 2, which opens (supplies the fuel) when the precombustion chamber fuel line pressure Pt is larger than the precombustion chamber pressure Ps, to be a desired amount.

Further, in some embodiments, as shown in FIGS. 1 and 2, the precombustion chamber gas engine 1 may further include a turbocharger 9 having a turbine T rotationally driven by the exhaust gas 'e' flowing through the exhaust passage 8, an exhaust bypass passage 83 allowing the exhaust gas 'e' to bypass the turbine T, and an exhaust bypass valve 85 disposed on the exhaust bypass passage 83 and capable of controlling the flow rate of the exhaust gas 'e' flowing through the exhaust bypass passage 83. More specifically, the turbocharger 9 includes the turbine T rotated by the exhaust gas 'e' discharged from the engine body 11, and a compressor C connected to the turbine T via a rotational shaft and rotationally driven by the turbine T. When the turbine T disposed on the exhaust passage 8 is driven by the exhaust gas 'e', the compressor C disposed on the intake passage 7 rotates and compresses the air flowing through the intake passage and sends the air to the main combustion chamber Rm.

Further, the exhaust bypass valve 85 is controlled, for instance, by the above-described engine control ECU 15 or the like so that the opening degree is increased to prevent the operating region of the compressor from entering the surge region, as well as the opening degree is adjusted in accordance with the temperature of the exhaust gas 'e' flowing into the turbine T (hereinafter, referred to as suction temperature Ta). The suction temperature Ta changes with change in season or environment, for instance. When the suction temperature Ta changes, the opening degree (hereinafter, referred to as exhaust bypass opening degree) of the exhaust bypass valve 85 is adjusted. Further, when the exhaust bypass opening degree of the exhaust bypass valve 85 is adjusted, fluctuation of the exhaust pressure or the like occurs as shown in FIGS. 5A to 5E. FIGS. 5A to 5E are diagrams each showing a control result of the opening degree of the precombustion-chamber-fuel-line-pressure adjustment valve 3 by the valve-opening-degree control device 5 according to an embodiment of the present invention, in a case where the exhaust pressure changes in accordance with the suction temperature Ta, each of which also shows a reference example in which the opening degree of the precombustion chamber fuel-line-pressure adjustment valve 3 is not controlled. In FIGS. 5A to 5E, the differential pressure D during exhaust is controlled to be equal to the target differential pressure Dt during exhaust.

Figure 5A:
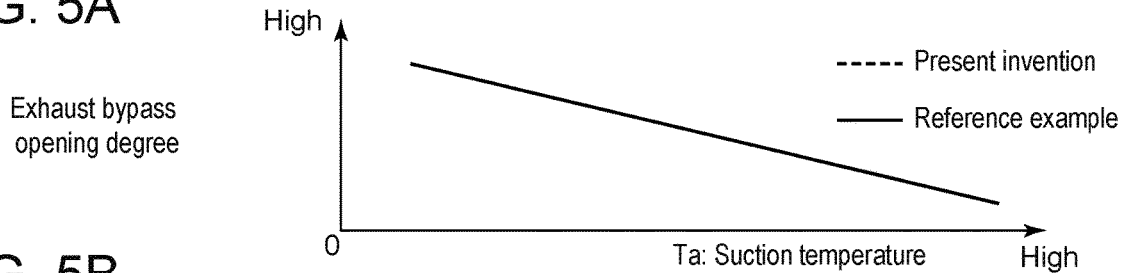
FIGS. 5A to 5E are diagrams each showing a control result of the opening degree of a precombustion-chamber-fuel-line-pressure adjustment valve by a valve-opening-degree control device according to an embodiment of the present invention, in a case where the exhaust pressure changes in accordance with the suction temperature, each of which also shows a reference example in which the opening degree of the precombustion chamber fuel-line-pressure adjustment valve 3 is not controlled.
Figure 5B:
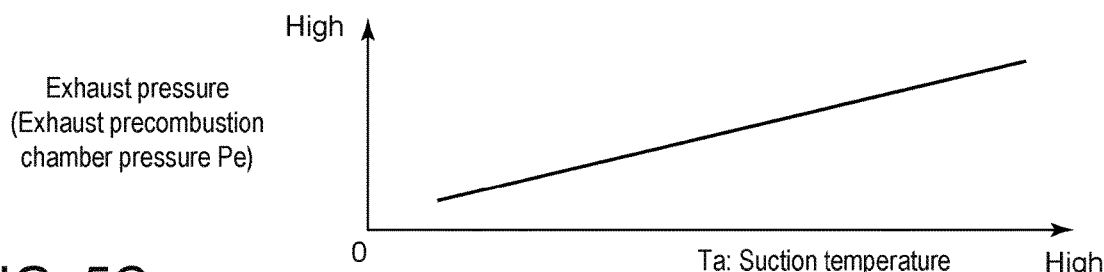

When referring to FIGS. 5A to 5E, as shown in FIG. 5A, the exhaust bypass opening degree of the exhaust bypass valve 85 is decreased as the suction temperature Ta increases. In other words, the exhaust bypass opening degree of the exhaust bypass valve 85 is increased as the suction temperature Ta decreases. In response to this change in the exhaust bypass opening degree, the exhaust pressure changes. That is, as the exhaust bypass opening degree of the exhaust bypass valve 85 decreases, the flow rate of the exhaust gas 'e' flowing through the exhaust bypass passage 83 decreases while the flow rate of the exhaust gas 'e' flowing into the turbine T increases, so that the exhaust pressure increases on the upstream side of the exhaust manifold 81 or the like. Conversely, as the exhaust bypass opening degree of the exhaust bypass valve 85 increases, the flow rate of the exhaust gas 'e' flowing through the exhaust bypass passage 83 increases while the flow rate of the exhaust gas 'e' bypassing the turbine T decreases, so that the exhaust pressure decreases on the upstream side. Thus, as shown in FIG. 5B, the exhaust pressure increases with increase in the suction temperature Ta and decreases with decrease in the suction temperature Ta.

Figure 5C:
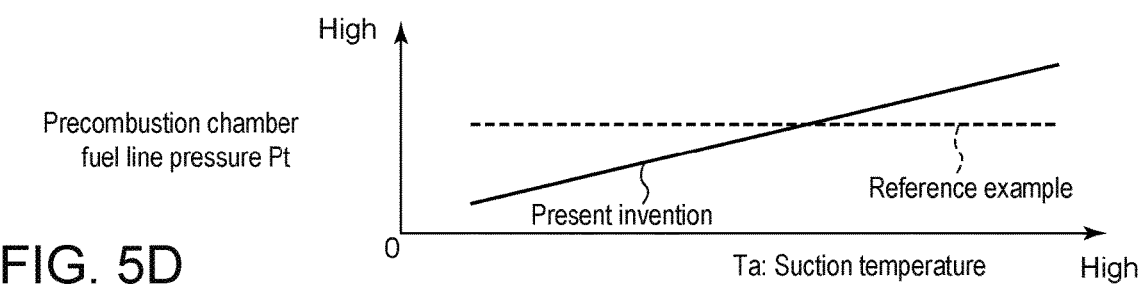
Figure 5D:
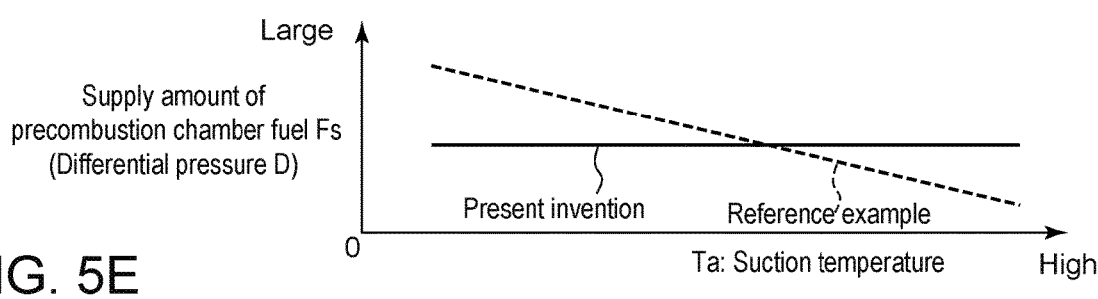
Figure 5E:
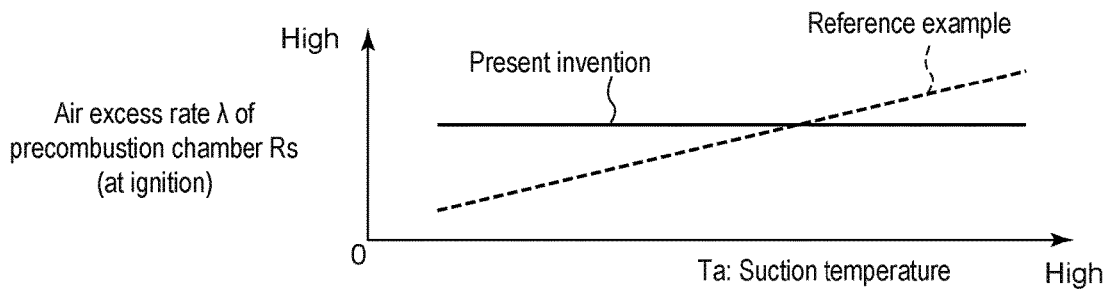

However, through control of the precombustion-chamber-fuel-line-pressure adjustment valve 3 by the valve-opening-degree control device 5, in a case where the exhaust pressure during exhaust (exhaust precombustion chamber pressure Pe) increases, the precombustion chamber fuel line pressure Pt is increased as shown by the solid line in FIG. 5C, and in a case where the exhaust precombustion chamber pressure Pe decreases, the precombustion chamber fuel line pressure Pt is decreased. Thus, as shown in FIG. 5D, by suppressing fluctuation of the differential pressure D between the precombustion chamber fuel line pressure Pt and the exhaust precombustion chamber pressure Pe, fluctuation of the supply amount of the precombustion chamber fuel Fs from the precombustion-chamber-fuel supply valve 2 is suppressed. Consequently, as shown in FIG. 5E, fluctuation of the air excess rate λ during ignition in the precombustion chamber Rs is also suppressed. That is, through control by the valve-opening-degree control device 5, the differential pressure D between the precombustion chamber fuel line pressure Pt and the exhaust precombustion chamber pressure Pe, the supply amount of the precombustion chamber fuel Fs from the precombustion-chamber-fuel supply valve 2, and the air excess rate λ during ignition in the precombustion chamber Rs are kept constant, regardless of change in the suction temperature Ta.

With the above configuration, even in a case where the exhaust pressure changes with change in the opening degree of the exhaust bypass valve 85 disposed on the exhaust bypass passage 83, by controlling the precombustion chamber fuel line pressure Pt in accordance with change in the exhaust pressure, it is possible to control the supply amount of the precombustion chamber fuel Fs to the precombustion chamber Rs from the precombustion-chamber-fuel supply valve 2, which opens (supplies the fuel) when the precombustion chamber fuel line pressure Pt is larger than the precombustion chamber pressure Ps, to be the target amount, during exhaust.

Further, in some embodiments, as shown in FIGS. 1 and 2, the precombustion chamber gas engine 1 may further include an intake-precombustion-chamber-pressure detection unit 43 for obtaining the precombustion chamber pressure Ps. The intake-precombustion-chamber-pressure detection unit 43 is capable of obtaining a precombustion chamber pressure during intake, i.e., intake precombustion chamber pressure Pi, which is related to the precombustion chamber pressure Ps when the intake valve 17, controlling the communication state between the cylinder 12 and the intake passage 7, is open. The intake precombustion chamber pressure Pi is, for instance, a pressure related to the pressure of the precombustion chamber Rs during the intake stroke, and if the intake valve 17 also opens during a stroke other than the intake stroke due to advancing the valve opening timing or the like, also includes the pressure during this period. Hereinafter, a period during which the intake valve 17 is open is referred to as "during intake".

In the embodiment shown in FIGS. 1 and 2, the intake-precombustion-chamber-pressure detection unit 43 is a pressure measurement unit capable of obtaining the pressure by measurement, such as a pressure gauge, and is connected to the valve-opening-degree control device 5 so that the detected intake precombustion chamber pressure Pi is input into the valve-opening-degree control device 5. Further, for instance, the intake precombustion-chamber-pressure detection unit 43 may be disposed on the intake passage 7, such as the intake manifold 71 which forms a part of the intake passage 7 (see FIGS. 1 and 2). When the intake valve 17 is open, the intake passage 7 communicates with the precombustion chamber Rs. Thus, by placing the pressure sensor (pressure gauge) in an appropriate position (for instance, on the intake passage 71) in the intake passage 7, it is possible to obtain the pressure of the precombustion chamber Rs during intake while suppressing the increase in cost. During intake, the pressure of the intake manifold 71 may not strictly coincide with the precombustion chamber pressure Ps. However, the pressure of the intake manifold 71 is correlated to the precombustion chamber pressure Ps, and thus in the present embodiment, the pressure of the intake manifold 71 is regarded as the intake precombustion chamber pressure Pi. Considering pressure loss between the precombustion chamber Rs and the installation position of the intake-precombustion-chamber-pressure detection unit 43, a detection value of the intake-precombustion-chamber-pressure detection unit 43 may be corrected to be used as the intake precombustion chamber pressure Pi. Thereby, it is possible to improve the accuracy of the intake precombustion chamber pressure Pi. Alternatively, the intake-precombustion-chamber-pressure detection unit 43 (pressure measurement unit) may be disposed on the precombustion-chamber forming member 19. Such a pressure sensor disposed on the precombustion-chamber forming member 19 can serve as both the exhaust-precombustion-chamber-pressure acquisition unit 41 and the intake-precombustion-chamber-pressure detection unit 43. However, the present invention is not limited to the above embodiment. In some embodiments, the intake-precombustion-chamber-pressure detection unit 43 may obtain the intake precombustion chamber pressure Pi by estimation from the operational condition of the precombustion chamber gas engine 1 or the like; for instance, the intake precombustion chamber pressure Pi may be calculated based on the output power, the fuel flow rate, or the air flow rate measured or calculated from the volumetric efficiency.

In this configuration, the valve-opening-degree control device 5 is configured to control the opening degree of the precombustion-chamber-fuel-line-pressure adjustment valve 3 so that the precombustion chamber fuel line pressure Pt increases when the intake precombustion chamber pressure Pi increases, and is configured to control the opening degree of the precombustion-chamber-fuel-line-pressure adjustment valve 3 so that the precombustion chamber fuel line pressure Pt decreases when the intake precombustion chamber pressure Pi decreases. Generally, the intake pressure varies with operational conditions of the engine, such as the output power and the rotational speed of the engine. If the intake pressure changes, the precombustion chamber pressure Ps changes, and the differential pressure D between the precombustion chamber fuel line pressure Pt and the precombustion chamber pressure Ps. Thus, as well as during exhaust, the precombustion chamber fuel Fs may be passively supplied from the precombustion-chamber-fuel supply valve 2 to the precombustion chamber Rs or stopped in response to change in the pressure. Accordingly, the valve-opening-degree control device 5 controls the opening degree of the precombustion-chamber-fuel-line-pressure adjustment valve 3 so as to counteract the change in the differential pressure D caused by the change in the intake pressure.

Thereby, also during intake, as well as during exhaust (see FIGS. 5A to 5E), even if the intake pressure changes, by controlling the opening degree of the precombustion-chamber-fuel-line-pressure adjustment valve 3 in accordance with the change in intake pressure, the change in the differential pressure D between the precombustion chamber fuel line pressure Pt and the precombustion chamber pressure Ps can be controlled or reduced. Thus, it is possible to prevent the precombustion chamber fuel Fs from being supplied excessively or insufficiently from the precombustion-chamber-fuel supply valve 2 during intake.

More specifically, the valve-opening-degree control device 5 may be configured to control the opening degree of the precombustion-chamber-fuel-line-pressure adjustment valve 3, so that the differential pressure between the precombustion chamber fuel line pressure Pt detected by the precombustion-chamber-fuel-line-pressure detection unit 42 and the intake precombustion chamber pressure Pi detected by the intake-precombustion-chamber-pressure detection unit 43 is equal to a target differential pressure Dt (target differential pressure Dt during intake). In the embodiment shown in FIGS. 1 and 2, the valve-opening-degree control device 5 is configured to calculate a difference ($|Pt-Pi|$) between the precombustion chamber fuel line pressure Pt input from the precombustion-chamber-fuel-line-pressure detection unit 42 and the intake precombustion chamber pressure Pi input from the intake-precombustion-chamber-pressure detection unit 43, and execute control of the opening degree of the precombustion-chamber-fuel-line-pressure adjustment valve 3, based on comparison between the calculated value and the target differential pressure Dt during intake stored in the memory. The target differential pressure Dt during intake may be same as, or different from the target differential pressure Dt during exhaust.

With the above configuration, the valve-opening-degree control device 5 is configured to control the opening degree of the precombustion-chamber-fuel-line-pressure adjustment valve 3 in accordance with the pressure (intake precombustion chamber pressure Pi) in the precombustion chamber when the intake valve 17 is open, for instance during the intake stroke, to adjust the precombustion chamber fuel line pressure Pt. More specifically, during intake, the opening degree of the precombustion-chamber-fuel-line-pressure adjustment valve 3 is controlled so that the differential pressure D between the precombustion chamber fuel line pressure Pt and the intake precombustion chamber pressure Pi is equal to the target differential pressure Dt during intake. Thereby, it is possible to control, not only during exhaust but also during intake, the supply amount of the precombustion chamber fuel Fs from the precombustion-chamber-fuel supply valve 2, which opens (supplies the fuel) when the precombustion chamber fuel line pressure Pt is larger than the precombustion chamber pressure Ps, to be a desired amount.

Further, by controlling the supply amount of the precombustion chamber fuel Fs from the precombustion-chamber-fuel supply valve 2 not only during exhaust but also during intake, it is possible to more reliably supply a desired amount of the precombustion chamber fuel Fs to the precombustion chamber Rs in each combustion cycle. Thus, it is possible to more reliably prevent excess or insufficiency of the total fuel (i.e. the sum of the precombustion chamber fuel Fs and the lean premixed gas flowing from the main combustion chamber Rm) in the precombustion chamber Rs during the combustion stroke in each combustion cycle.

Figure 6:
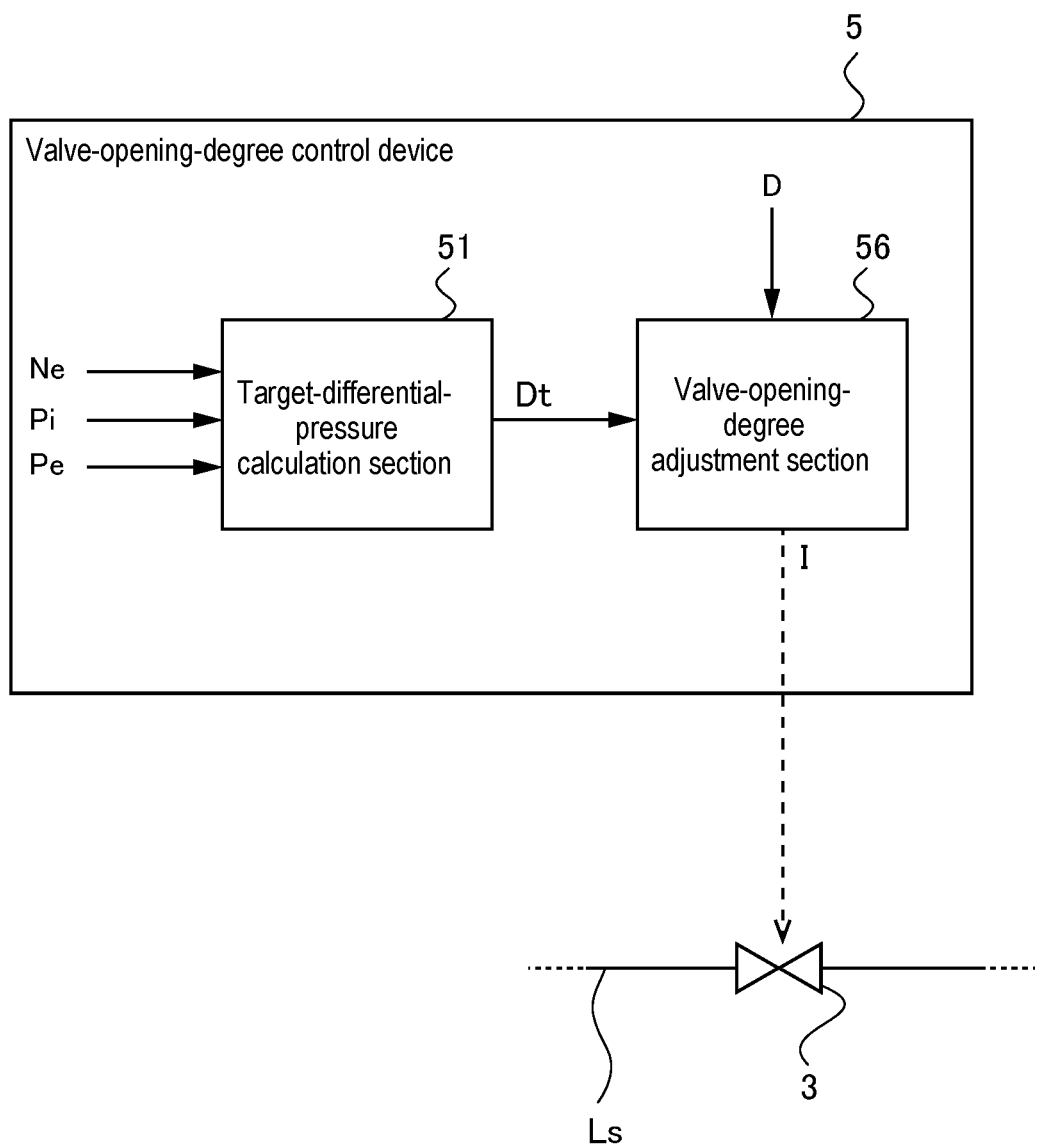
FIG. 6 is a functional block diagram of a valve-opening-degree control device according to an embodiment of the present invention.
Figure 7:
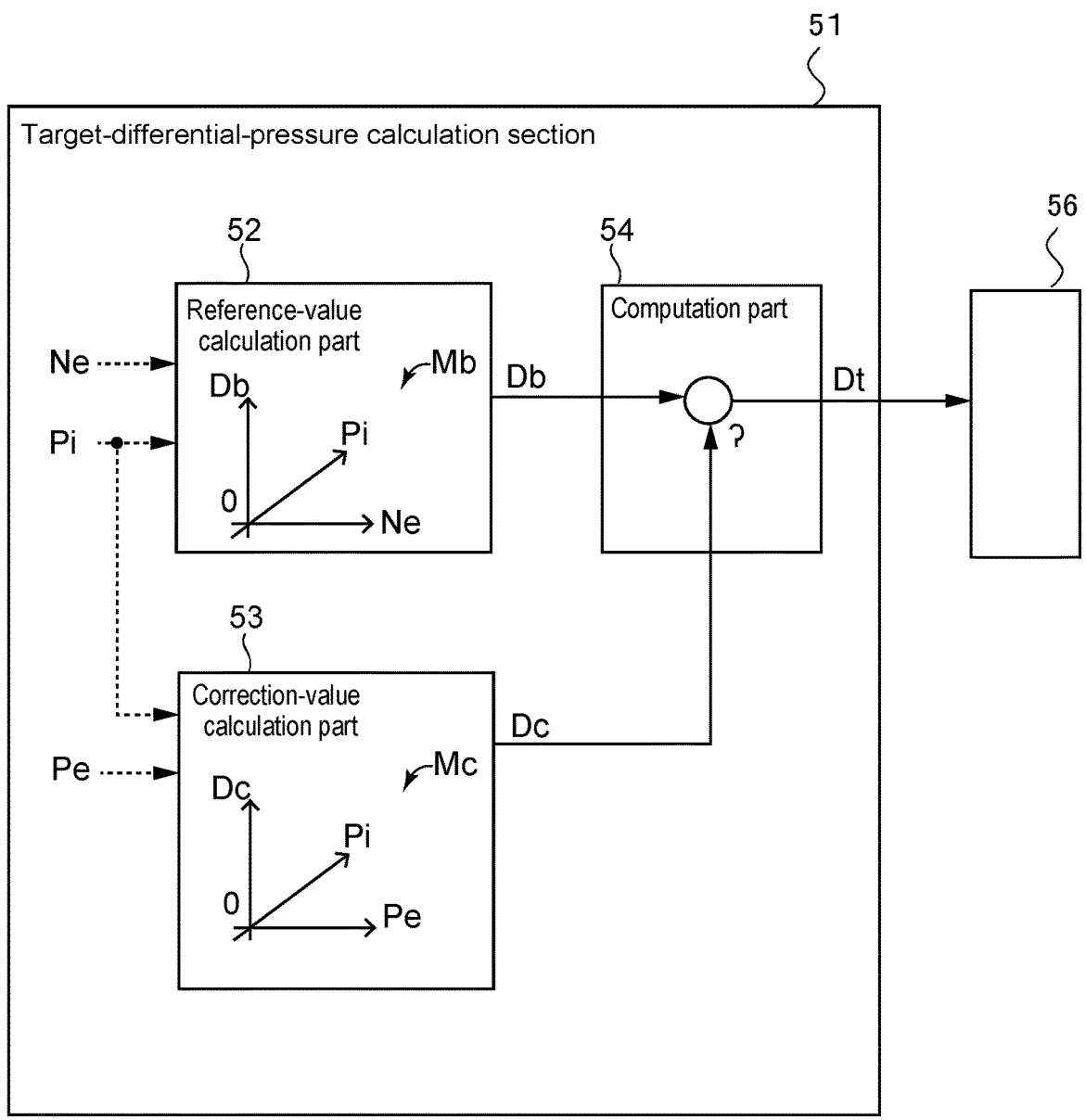
FIG. 7 is a functional block diagram showing a detail of a target-differential-pressure calculation section according to an embodiment of the present invention.

Hereinafter, a specific configuration of the valve-opening-degree control device 5 will be described with reference to FIGS. 6 and 7. FIG. 6 is a functional block diagram of the valve-opening-degree control device 5 according to an embodiment of the present invention. FIG. 7 is a functional block diagram showing a detail of a target-differential-pressure calculation section 51 according to an embodiment of the present invention. FIGS. 5A to 5E and 6 correspond to a case where the valve-opening-degree control device 5 performs control of the differential pressure between the precombustion chamber fuel line pressure Pt and the precombustion chamber pressure Ps during both intake and exhaust.

In some embodiments, as shown in FIGS. 6 and 7, the valve-opening-degree control device 5 includes a target-differential-pressure calculation section 51 for calculating the target differential pressure Dt during exhaust, which is a target value of the differential pressure D between the precombustion chamber fuel line pressure Pt and the exhaust precombustion chamber pressure Pe, based on the engine rotational speed Ne, the intake precombustion chamber pressure Pi, and the exhaust precombustion chamber pressure Pe, and a valve-opening-degree adjustment section 56 for adjusting the opening degree of the precombustion-chamber-fuel-line-pressure adjustment valve 3 so that the differential pressure D during exhaust is equal to the target differential pressure Dt. In the precombustion chamber gas engine 1, in each combustion cycle, the precombustion chamber fuel Fs supplied from the precombustion-chamber-fuel supply valve 2 and the lean premixed gas flowing from the main combustion chamber Rm are mixed to form an air-fuel mixture having a concentration suitable for ignition in the precombustion chamber Rs, and supply of the precombustion chamber fuel Fs from the precombustion-chamber-fuel supply valve 2 is performed during intake and exhaust where the precombustion chamber fuel line pressure Pt can be larger than the precombustion chamber pressure Ps. Thus, by determining the target differential pressure Dt during exhaust in consideration of the engine rotational speed Ne and the intake precombustion chamber pressure Pi, the target differential pressure Dt during intake calculated from these factors are taken into consideration. Thereby, the target differential pressure Dt corresponding to the precombustion chamber fuel Fs to be supplied from the precombustion-chamber-fuel supply valve 2 during exhaust is calculated in consideration of the precombustion chamber fuel Fs supplied from the precombustion-chamber-fuel supply valve 2 during intake.

In the embodiment shown in FIGS. 6 and 7, the target-differential-pressure calculation section 51 receives input including the exhaust precombustion chamber pressure Pe from the exhaust-precombustion-chamber-pressure acquisition unit 41, the intake precombustion chamber pressure Pi from the intake-precombustion-chamber-pressure detection unit 43, and the engine rotational speed Ne calculated based on a detection value of a crank angle sensor 16s (see FIG. 1) capable of detecting the crank angle $\theta$ of the crank shaft 16. Further, the target-differential-pressure calculation section 51 is connected to the valve-opening-degree adjustment section 56. The valve-opening-degree adjustment section 56 is configured to transmit a valve-opening-degree instruction I to the precombustion-chamber-fuel-line-pressure adjustment valve 3 upon receipt of the target differential pressure Dt during exhaust from the target-differential-pressure calculation section 51. As shown in FIG. 6, the differential pressure D between the precombustion chamber fuel line pressure Pt and the precombustion chamber pressure Ps (during exhaust, exhaust precombustion chamber pressure Pe, during intake, intake precombustion chamber pressure Pi, or an average of the exhaust precombustion chamber pressure Pe and the intake precombustion chamber pressure Pi) is input into the valve-opening-degree adjustment section 56, and on the basis of feedback on the differential pressure D, the valve-opening-degree adjustment section 56 may control the opening degree of the precombustion-chamber-fuel-line-pressure adjustment valve 3 so that the differential pressure D is equal to the target differential pressure Dt.

With the above configuration, since the valve-opening-degree control device 5 includes the target-differential-pressure calculation section 51 and the valve-opening-degree adjustment section 56, it is possible perform control so that the differential pressure D between the precombustion chamber fuel line pressure Pt and the exhaust precombustion chamber pressure Pe is equal to the target differential pressure Dt, during exhaust.

Regarding the target-differential-pressure calculation section 51, in some embodiments, as shown in FIG. 7, the target-differential-pressure calculation section 51 includes a reference-value calculation part 52 for calculating a reference value Db of the target differential pressure Dt during exhaust based on the engine rotational speed Ne and the intake precombustion chamber pressure Pi, a correction-value calculation part 53 for calculating a correction value Dc for correcting the reference value Db based on the intake precombustion chamber pressure Pi and the exhaust intake precombustion chamber pressure Pe, and a computation part 54 for calculating the target differential pressure Dt based on the reference value Db and the correction value Dc.

In the embodiment shown in FIG. 7, the reference-value calculation part 52 calculates the reference value Db using a reference-value calculation map Mb for calculating the reference value based on the engine rotational speed Ne and the intake precombustion chamber pressure Pi. The correction-value calculation part 53 calculates the correction value Dc using a correction-value calculation map Mc for calculating the correction value Dc based on the intake precombustion chamber pressure Pi and the exhaust precombustion chamber pressure Pe. Further, the reference-value calculation part 52 and the correction-value calculation part 53 are each connected to the computation part 54, and the reference value Db and the correction value Dc are input into the computation part 54. The computation part 54 calculates the target differential pressure Dt by operation such as subtraction of the reference value Db and the correction value Dc. The target differential pressure Dt thus calculated is transmit to the valve-opening-degree adjustment section 56.

With the above configuration, the target-differential-pressure calculation section 51 is configured to calculate the target differential pressure Dt by correcting the reference value Db calculated based on the engine rotational speed Ne and the intake precombustion chamber pressure Pi with the correction value Dc calculated based on the intake precombustion chamber pressure Pi and the exhaust precombustion chamber pressure Pe. Thereby, in a case where control of the supply amount of the precombustion chamber fuel Fs based on the target differential pressure Dt during intake is already performed based on the engine rotational speed Ne and the intake precombustion chamber pressure Pi, it is possible to easily add control of the target differential pressure Dt during exhaust.

In some embodiments, as described above, the exhaust precombustion chamber pressure Pe is obtained by measurement with the exhaust-precombustion-chamber-pressure acquisition unit 41, and the target-differential-pressure calculation section 51 uses the exhaust precombustion chamber pressure Pe thus measured.

In some embodiments, the exhaust-precombustion-chamber-pressure acquisition unit 41 is configured to obtain the exhaust precombustion chamber pressure Pe by estimation, and the target-differential-pressure calculation section 51 uses the estimated exhaust precombustion chamber pressure Pe. In more detail, the exhaust-precombustion-chamber-pressure acquisition unit 41 is configured to estimate the precombustion chamber pressure Ps based on a command value of the exhaust bypass opening degree of the exhaust bypass valve 85 of the turbocharger 9. Specifically, the exhaust pressure is estimated by using an expression for calculating the exhaust pressure ($P_{exhaust}$) when the exhaust bypass ratio α, which is a ratio of the exhaust gas 'e' passing through the exhaust bypass passage 83 to the exhaust gas 'e' discharged from the engine body 11, is changed, to estimate the precombustion chamber pressure Ps. The command value of the exhaust bypass opening degree has a predetermined functional relationship with the exhaust bypass ratio α, and the exhaust bypass ratio α is determined from the command value of the exhaust bypass opening degree.

The expression for calculating the exhaust pressure ($P_{exhaust}$) will be described in more detail. Assuming that the pressure and temperature of the compressor inlet is equal to the pressure and temperature of the atmosphere, and the pressure and temperature of the compressor outlet is equal to the pressure and temperature of the intake port 72, the driving work $W_{comp}$ of the compressor C is expressed by the following expression (1):

$$W_{comp} = \frac{\kappa}{\kappa - 1} R T_0 \left[ \left( \frac{P_{inmani}}{p_0} \right)^{\frac{\kappa-1}{\kappa}} - 1 \right] \Big/ \eta_{comp} \qquad \text{Expression (1)}$$

wherein $P_0$ is the atmospheric pressure, $T_0$ is the inlet temperature (suction temperature Ta), $P_{inmani}$ is the intake manifold pressure, $\eta_{comp}$ is the compressor efficiency, κ is the heat capacity ratio, and R is the gas constant.

Similarly, assuming that pressure and temperature of the turbine inlet is equal to the pressure and temperature of the exhaust port 82, the turbine work $W_{turb}$ is expressed by the following expression (2):

$$W_{turb} = \frac{\kappa}{\kappa - 1} R T_{exhaust} \left[ 1 - \left( \frac{P_{exhaust}}{p_a} \right)^{(\kappa-1)/\kappa} \right] \eta_{turb} \cdot \alpha \qquad \text{Expression (2)}$$

wherein $T_{exhaust}$ is the turbine inlet temperature (cylinder outlet exhaust gas temperature), $P_a$ is the back pressure on turbine, and $\eta_{turb}$ is the turbine efficiency.

Further, let $\eta_m$ be the supercharger mechanical efficiency, from the relationship of supercharger total efficiency $\eta_T = \eta_{comp} \times \eta_{turb} \times \eta_m \times \alpha$, the exhaust pressure ($P_{exhaust}$) is expressed by the following expression (3):

$$P_{exhaust} = p_a \cdot \left\{ \left[ 1 - \frac{T_0}{\eta_T T_{exhaust}} \left\{ \left( \frac{P_{inmani}}{p_0} \right)^{\frac{\kappa-1}{\kappa}} - 1 \right\} \right]^{-\frac{\kappa}{\kappa-1}} \right\}^{-1} \qquad \text{Expression (3)}$$

According to the expression (3), if the exhaust bypass ratio α relative to the exhaust bypass opening degree is known, the exhaust pressure ($P_{exhaust}$) can be calculated from the above expression. Thus, since the exhaust bypass ratio α is determined based on the command value of the exhaust bypass opening degree, the precombustion chamber pressure Ps can be calculated.

However, the present invention is not limited to the above embodiment. In some embodiments, the exhaust-precombustion-chamber-pressure acquisition unit 41 may obtain the exhaust precombustion chamber pressure Pe by estimation using information other than the command value of the exhaust bypass opening degree.

Embodiments of the present invention were described in detail above, but the present invention is not limited thereto, and various amendments and modifications may be implemented.

REFERENCE SIGNS LIST

1 Precombustion chamber gas engine
11 Engine body
12 Cylinder
13 Piston
14 Injector
15 Engine control ECU
16 Crank shaft
16s Crank angle sensor
17 Intake valve
18 Exhaust valve
19 Precombustion-chamber forming member
19f Ignition plug
2 Precombustion-chamber-fuel supply valve
3 Precombustion-chamber-fuel-line-pressure adjustment valve
41 Precombustion-chamber-pressure acquisition unit
42 Precombustion-chamber-fuel-line-pressure detection unit
43 Precombustion-chamber-pressure detection unit
5 Valve-opening-degree control device
51 Target-differential-pressure calculation section
52 Reference-value calculation part
53 Correction-value calculation part
54 Computation part
56 Valve-opening-degree adjustment section
7 Intake passage
71 Intake manifold
72 Intake port
8 Exhaust passage
81 Exhaust manifold
82 Exhaust port
83 Exhaust bypass passage
85 Exhaust bypass valve
9 Turbocharger
C Compressor
T Turbine
Ls Precombustion-chamber-fuel supply line
Rm Main combustion chamber
Rs Precombustion chamber
Ps Precombustion chamber pressure
Pe Exhaust precombustion chamber pressure
Pi Intake precombustion chamber pressure
Pt Precombustion chamber fuel line pressure
e Exhaust gas
a Air
Fs Precombustion chamber fuel
Ta Suction temperature
Ne Engine rotational speed
D Differential pressure (Differential pressure between precombustion chamber fuel line pressure and precombustion chamber pressure)
Db Reference value
Dc Correction value
Dt Target differential pressure
I Valve-opening-degree instruction
Mb Reference-value calculation map
Mc Correction-value calculation map

The invention claimed is:

1. A precombustion chamber gas engine including a precombustion chamber communicating with a main combustion chamber, comprising:

a precombustion-chamber-fuel supply line through which a precombustion chamber fuel flows;

a precombustion-chamber-fuel supply valve connected to the precombustion-chamber-fuel supply line and controlling supply of the precombustion chamber fuel to the precombustion chamber, the precombustion-chamber-fuel supply valve being configured to open when a precombustion chamber fuel line pressure, which is a pressure of the precombustion-chamber-fuel supply line, is larger than a precombustion chamber pressure, which is a pressure of the precombustion chamber;

a precombustion-chamber-fuel-line-pressure adjustment valve disposed on the precombustion-chamber-fuel supply line and capable of adjusting the precombustion chamber fuel line pressure;

an exhaust-precombustion-chamber-pressure acquisition unit capable of obtaining an exhaust precombustion chamber pressure which is a pressure related to the precombustion chamber pressure when an exhaust valve controlling a communication state between an exhaust passage and a cylinder forming the main combustion chamber is open;

a valve-opening-degree control device configured to control an opening degree of the precombustion-chamber-fuel-line-pressure adjustment valve, a precombustion-chamber-fuel-line-pressure detection unit for detecting the precombustion chamber fuel line pressure of the precombustion-chamber-fuel supply line, and an intake-precombustion-chamber-pressure detection unit for obtaining the precombustion chamber pressure, the intake-precombustion-chamber-pressure detection unit being capable of obtaining an intake precombustion chamber pressure which is a pressure related to the precombustion chamber pressure when an intake valve controlling a communication state between an intake passage and the cylinder is open, wherein the valve-opening-degree control device is configured to control the opening degree of the precombustion-chamber-fuel-line-pressure adjustment valve in accordance with the exhaust precombustion chamber pressure obtained by the exhaust-precombustion-chamber-pressure acquisition unit, wherein the valve-opening-degree control device is configured to control the opening degree of the precombustion-chamber-fuel-line-pressure adjustment valve so that the precombustion chamber fuel line pressure increases when the exhaust precombustion chamber pressure increases, and the valve-opening-degree control device is configured to control the opening degree of the precombustion-chamber-fuel-line-pressure adjustment valve so that the precombustion chamber fuel line pressure decreases when the exhaust precombustion chamber pressure decreases, wherein the valve-opening-degree control device is configured to control the opening degree of the precombustion-chamber-fuel-line-pressure adjustment valve so that a differential pressure during exhaust between the precombustion chamber fuel line pressure detected by the precombustion-chamber-fuel-line-pressure detection unit and the exhaust precombustion chamber pressure obtained by the exhaust-precombustion-chamber-pressure acquisition unit is equal to a target differential pressure during exhaust, and wherein the valve-opening-degree control device includes:
a target-differential-pressure calculation section for calculating the target differential pressure during exhaust, based on an engine rotational speed, the intake precombustion chamber pressure, and the exhaust precombustion chamber pressure; and
a valve-opening-degree adjustment section for adjusting the opening degree of the precombustion-chamber-fuel-line-pressure adjustment valve so that the differential pressure during exhaust is equal to the target differential pressure during exhaust.

2. The precombustion chamber gas engine according to claim 1, further comprising:
a turbocharger including a turbine rotationally driven by an exhaust gas flowing through the exhaust passage; and
an exhaust bypass valve disposed on an exhaust bypass passage allowing the exhaust gas to bypass the turbine, the exhaust bypass valve being capable of controlling a flow rate of the exhaust gas flowing through the exhaust bypass passage.

3. The precombustion chamber gas engine according to claim 1,
wherein the valve-opening-degree control device is configured to control the opening degree of the precombustion-chamber-fuel-line-pressure adjustment valve so that a differential pressure between the precombustion chamber fuel line pressure detected by the precombustion-chamber-fuel-line-pressure detection unit and the intake precombustion chamber pressure obtained by the intake-precombustion-chamber-pressure detection unit is equal to a target differential pressure during intake.

4. The precombustion chamber gas engine according to claim 1,
wherein the target-differential-pressure calculation section includes:
a reference-value calculation part for calculating a reference value of the target differential pressure during exhaust, based on the engine rotational speed and the intake precombustion chamber pressure;
a correction-value calculation part for calculating a correction value for correcting the reference value, based on the intake precombustion chamber pressure and the exhaust precombustion chamber pressure; and
a computation part for calculating the target differential pressure during exhaust, based on the reference value and the correction value.

5. The precombustion chamber gas engine according to claim 1,
wherein the intake-precombustion-chamber-pressure detection unit is a pressure measurement unit capable of obtaining a pressure by measurement.

6. The precombustion chamber gas engine according to claim 5,
wherein the pressure measurement unit is configured to detect a pressure of an intake manifold forming a part of the intake passage.

7. The precombustion chamber gas engine according to claim 1,
wherein the intake-precombustion-chamber-pressure detection unit is configured to obtain the intake precombustion chamber pressure by estimation.

8. The precombustion chamber gas engine according to claim 1,
   wherein the exhaust-precombustion-chamber-pressure acquisition unit is a pressure measurement unit capable of obtaining a pressure by measurement.

9. The precombustion chamber gas engine according to claim 8,
   wherein the pressure measurement unit is configured to detect a pressure of an exhaust manifold forming a part of the exhaust passage.

10. The precombustion chamber gas engine according to claim 1,
    wherein the exhaust-precombustion-chamber-pressure acquisition unit is configured to obtain the exhaust precombustion chamber pressure by estimation.

* * * * *